United States Patent [19]

Kimura et al.

[11] Patent Number: 5,272,421
[45] Date of Patent: Dec. 21, 1993

[54] DIGITAL IMAGE CORRECTION DEVICE

[75] Inventors: Yuichiro Kimura; Kuninori Matsumi; Michitaka Ohsawa, all of Kanagawa, Japan

[73] Assignees: Hitachi, Ltd., Tokyo; Hitachi Video and Information System, Incorporated, Yokohama, both of Japan

[21] Appl. No.: 935,997

[22] Filed: Aug. 27, 1992

[30] Foreign Application Priority Data

Aug. 30, 1991 [JP] Japan .................................. 3-219607

[51] Int. Cl.⁵ ......................... G09G 1/04; H01J 29/70
[52] U.S. Cl. ................................. 315/368.12; 315/367
[58] Field of Search ............. 315/367, 368.12, 368.13, 315/370

[56] References Cited

U.S. PATENT DOCUMENTS

| | | | |
|---|---|---|---|
| 4,401,922 | 8/1983 | Kamata et al. | 315/368.12 |
| 4,754,204 | 6/1988 | Ando et al. | 315/367 |
| 4,799,000 | 1/1989 | Close | 315/371 |
| 4,816,908 | 3/1989 | Colineau et al. | 358/60 |

Primary Examiner—Gregory C. Issing
Attorney, Agent, or Firm—Antonelli, Terry, Stout & Kraus

[57] ABSTRACT

An image correction device includes a memory (70) for storing correction data, an address generator (15,31) for supplying addresses to the memory, a regulation pattern generator (40), a DA converter (71) for converting an output of the memory into an analog signal, convergence yoke (CY) coils (74), CY drive amplifiers (73) for converting the analog signal into current for driving the CY coils, a CPU (20) for controlling operation of the image correction device, deflection current detection circuits (10,11) for reading vertical and horizontal deflection currents in the CPU and a memory (60) for storing correction data and deflection currents.

35 Claims, 11 Drawing Sheets

SIZE REDUCTION

DIGITAL IMAGE CORRECTION DEVICE

BACKGROUND OF THE INVENTION

The present invention relates to an image correction system for a cathode ray tube (CRT) display such as a color television receiver or a display terminal and, particularly, to a digital image correction device for use in a multi-mode CRT display device having a plurality of display modes which are different from each other in electron beam deflecting condition.

As an example of a conventional digital image correction device, a digital convergence correction device responsible to any of a plurality of signal specifications is disclosed in Japanese Patent Application Laid-open (Kokai (P)) No. 61-222392.

In the disclosed digital convergence correction device, convergence correction data of regulation points are stored in a memory and the read address timing is controlled by respective input signals so that the location of regulation point on an image screen is always maintained fixed. However, this prior art is silent as to the difficulty of maintaining the regulation point at such fixed location by independently controlling timing of the respective regulation points. Further, in such system in which all of regulation points are controlled evenly, accuracy of correction is not enough, and thus it is necessary to reregulate them for every input signal or every change of raster size.

SUMMARY OF THE INVENTION

An object of the present invention is, therefore, to provide an image correction device for use in a multimode display device which performs image correction including convergence correction.

Another object of the present invention is to provide a digital convergence correction device capable of accurately responding to change of display signal specification or raster size by a single regulation without necessity of re-regulation, and a regulation method therefor.

In order to achieve the above objects, according to the present invention, convergence correction data or image correction data and horizontal and vertical deflection currents corresponding thereto in a mode which is used as a reference mode for respective regulation points are stored, and convergence correction data or image correction data suitable for the deflection currents of the respective regulation points at that time are calculated on the basis of correlation between the deflection currents and the convergence correction data (image correction data) in the reference mode when the mode is changed, that is, when the display signal specification or raster size is changed.

With the above mentioned scheme in which convergence correction data (image correction data) of regulation points are obtained by calculation, there is no troublesome address control required, and, for example, timing of the regulation points may be at equidistant interval which is the simplest.

Further, since the present invention utilizes correlation between deflection currents which have a 1:1 correspondence to positions on an image screen and convergence correction data (image correction data), it is possible to obtain convergence correction data for each position of the regulation points independently even if positions of the regulation points are changed, resulting in high correction accuracy. Therefore, by once regulating them in a reference mode, there is no need of re-regulation for any succeeding change of mode.

BRIEF DESCRIPTION OF THE DRAWINGS

The above-mentioned and other objects, features and advantages of the present invention will become more apparent from the following detailed description when taken in conjunction with the accompanying drawings, wherein.

DETAILED DESCRIPTION OF THE PREFERRED EMBODIMENTS

Figure 1:
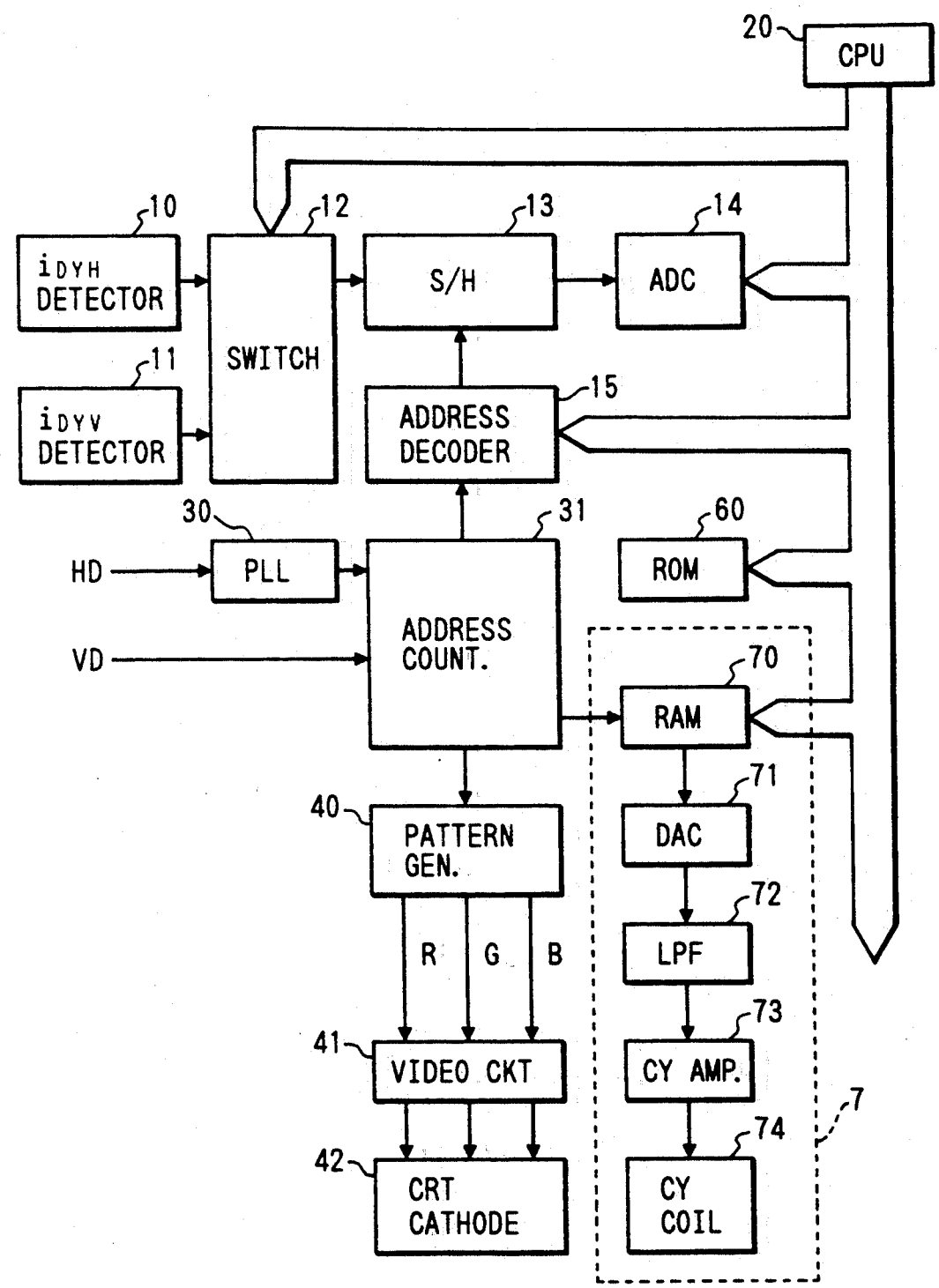
FIG. 1 shows a block circuit diagram showing a construction of a first embodiment of the present invention.

FIG. 1 shows a construction of a first embodiment of a digital convergence correction device according to the present invention. In FIG. 1, the digital convergence correction device includes a central processing unit (CPU) 20, a first detection circuit 10 for detecting a horizontal deflection current $i_{DYH}$ flowing through a horizontal deflection coil of a CRT of a display device, a second detection circuit 11 for detecting a vertical deflection current $i_{DYV}$ flowing through a vertical deflection coil of the CRT, an analog data switching circuit 12 for receiving analog signals from the detection circuits 10 and 11 and outputting either one of the analog signals under control of the CPU 20, a sample-hold circuit 13 for sampling/holding the analog signal from the switching circuit 12 under control of the CPU 20 according to sampling pulses supplied thereto, an analog to digital converter (ADC) 14 for converting an output analog signal from the sample-hold circuit 13 into a digital signal under control of the CPU 20, a phase locked loop (PLL) circuit 30 for multiplying a horizontal synchronizing signal HD to generate a basic clock signal, an address counter 31 responsive to a vertical synchronizing signal VD to count the basic clocks from the PLL circuit 30 to thereby generate an address signal, an address decoder 15 for decoding the address signal from the address counter 31 and generating the sampling pulses, a pattern generator 40 responsive to the address signal from the address counter 31 for generating a display pattern for convergence regulation, and a video circuit 41 connected to CRT cathode device 42.

The CPU controls operation of the whole digital convergence correction system including peripheral input devices (keyboard, etc.), an electrically erasable and programmable read only memory (EEPROM) 60 for storing convergence correction data of regulation points in a reference mode, deflection currents and numerical values related thereto and a convergence correction unit 7 including a random access memory (RAM) 70 for storing convergence correction data of all of correction points (regulation point and correction point will be defined clearly later), a digital to analog converter (DAC) 71 for converting a digital signal into an analog signal, a low pass filter (LPF) 72 for removing high harmonic signal components, a convergence yoke (CY) coil 74, and a convergence yoke (CY) amplifier 73 for amplifying an output signal of the LPF 72 to drive the CY coil 74.

In operation, first, the horizontal synchronizing signal HD contained in a display signal, or a signal synchronized therewith, is supplied to the PLL circuit 30. The PLL circuit 30 generates the basic clock signal in response thereto. The basic clock signal is supplied together with the vertical synchronizing signal VD of the display signal, or any signal synchronized, therewith to the address counter 31. The address counter 31 generates addresses corresponding to vertical and horizontal time phases, that is, addresses corresponding to positions of the vertical synchronizing signals VD and the basic clock signal from the PLL 30, on an image screen. The addresses generated are input to the pattern generator 40, the address decoder 15 and the RAM 70 of the convergence correction unit 7, respectively. The pattern generator 40 functions to generate a display pattern (cross hatching, etc.) on the screen which is necessary to regulate convergence. The pattern generator 40 can on-off control displays of red, green and blue colors separately, and an output of the generator 40 is, after, amplified by the video circuit 41, supplied to the cathode 42 of the CRT and displayed thereon.

Figure 2:
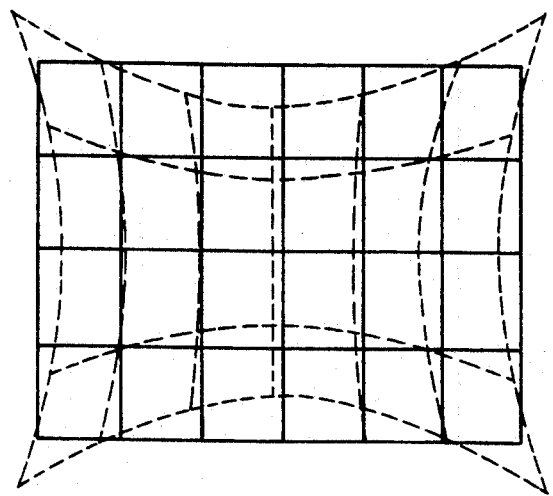
FIG. 2 shows an example of a display before and after convergence regulation.

FIG. 2 shows an example of display of a regulation pattern before and after convergence regulation, in which dotted lines show the display before convergence regulation, and solid lines show the display after convergence regulation. It should be noted that FIG. 2 shows a display of only one of the red, green and blue colors for simplicity of illustration. A cross hatching is provided as reference, and convergence regulation is performed such that lattice points (regulation points) of red, green and blue colors are overlapped with lattice points of the reference cross hatching, respectively. The convergence correction data of them are written in the ROM 60.

Figure 3:
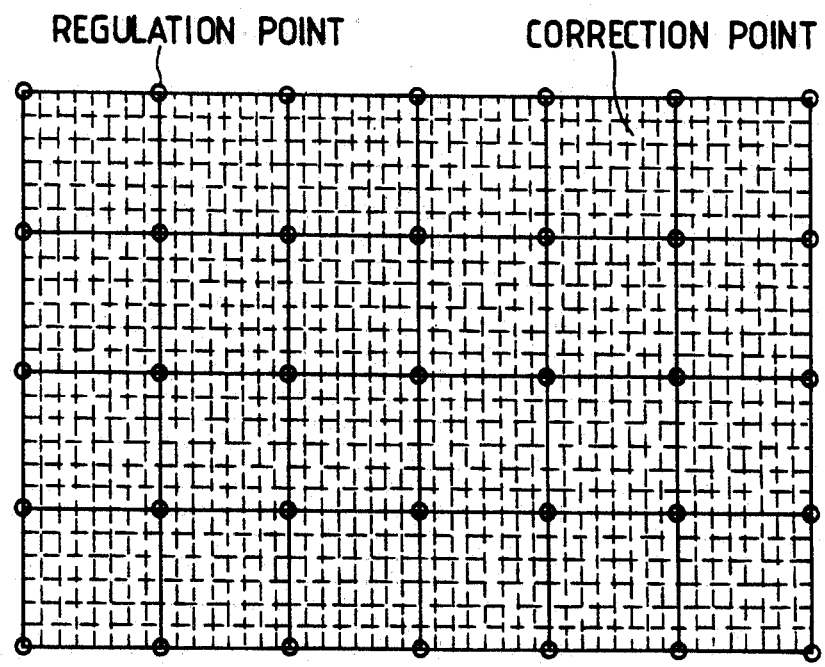
FIG. 3 shows a relation between regulation points and correction points.

Now, a relation between regulation point and correction point will be described with reference to FIG. 3 in which positions of respective regulation points and correction points are plotted on an image screen after convergence regulation. In FIG. 3, circles indicate regulation points and respective cross points indicate correction points. Individual correction data can be set at the respective correction points from which convergence correction data are derived. On the other hand, regulation points are set at selected ones of the correction points, at which convergence regulation is actually performed. That is, regulation is performed at regulation points, each being a representative of a certain number of correction points, and for other correction points correction data are obtained by interpolation on the basis of correction data of the regulation points. In the shown example, interpolation is performed by software by means of the CPU 20. In this case, correction accuracy is degraded when distance between adjacent regulation points is large. Therefore, in order to avoid such degradation of correction accuracy, it is desirable to increase the number of regulation points. However, the number of regulation points should be as small as possible in view of time required to perform interpolation. Although time, image screen position or deflection currents, etc., may be usable as variables of the interpolation function, it is usual to use time as the variable in view of convenience of variable management. In view of possibility of optimizing the time constant of the LPF 72, the possibility of simplifying interpolation and easiness of managing time as the variable, inter-correction point distance and inter-regulation point distance are made equal in time, respectively.

Convergence correction data of respective correction points thus obtained are written in predetermined addresses of the RAM 70 shown in FIG. 1 corresponding to positions on an image plane, and then are read out by output addresses of the address counter 31 correspondingly to the image plane positions within one vertical scan period. The digital convergence correction data thus read out are converted by the DAC 71 into analog signals. The analog signal, whose high harmonic components are removed by the LPF 72, is converted by the CY amplifier 73 into a predetermined current to be passed through the CY coil 74.

The number of convergence correction units 7 corresponds to the number of convergence correction systems, that is, the CY coils 74. For example, in a case of a projection type television receiver, horizontal and vertical convergence regulation functions are required for each of at least the red and blue colors; that is, at least four convergence correction units 7 are required. Further, convergence regulation function for green color is necessary to make correction of graphic distortion possible with this system. In such case, the number of required convergence correction units 7 becomes six.

Sufficient convergence correction is possible by this method for a certain display mode. However, since positions of regulation points on an image plane may be changed in another mode in which raster size and/or signal specification is different from those in the certain mode, it is not always possible to correct convergence in such mode. Therefore, in such case, it is not always possible to use convergence correction data written in the ROM 60 as they are.

In order to solve this problem, in the present invention, deflection currents having a 1:1 correlation to each position on the image plane are stored together with the convergence correction data concerning that position, in the ROM 60. Thus, even if a position of the regulation points is changed, convergence correction data suitable for that position can be obtained by detecting the deflection currents at that position in the current mode and performing an interpolation using the correlation between deflection currents and the convergence correction data.

The horizontal deflection current detection circuit 10 and the vertical deflection current detection circuit 11 pick up horizontal and vertical deflection currents $i_{DYH}$ and $i_{DYV}$ flowing through the DY coils as voltages, respectively. One of the voltages is selected by the switching circuit 12 and supplied to the S/H circuit 13.

The address decoder 15 decodes an output address of the address counter 31 and outputs sampling pulses to the sample/hold circuit 13 in accordance with the timing of a single regulation point determined by the CPU 20. The sample/hold circuit 13 samples a deflection current value (converted into voltage value) at the regulation point determined by the CPU 20, and the sampled analog value is converted into a digital value by the ADC 14 and read in the CPU.

Figure 4:
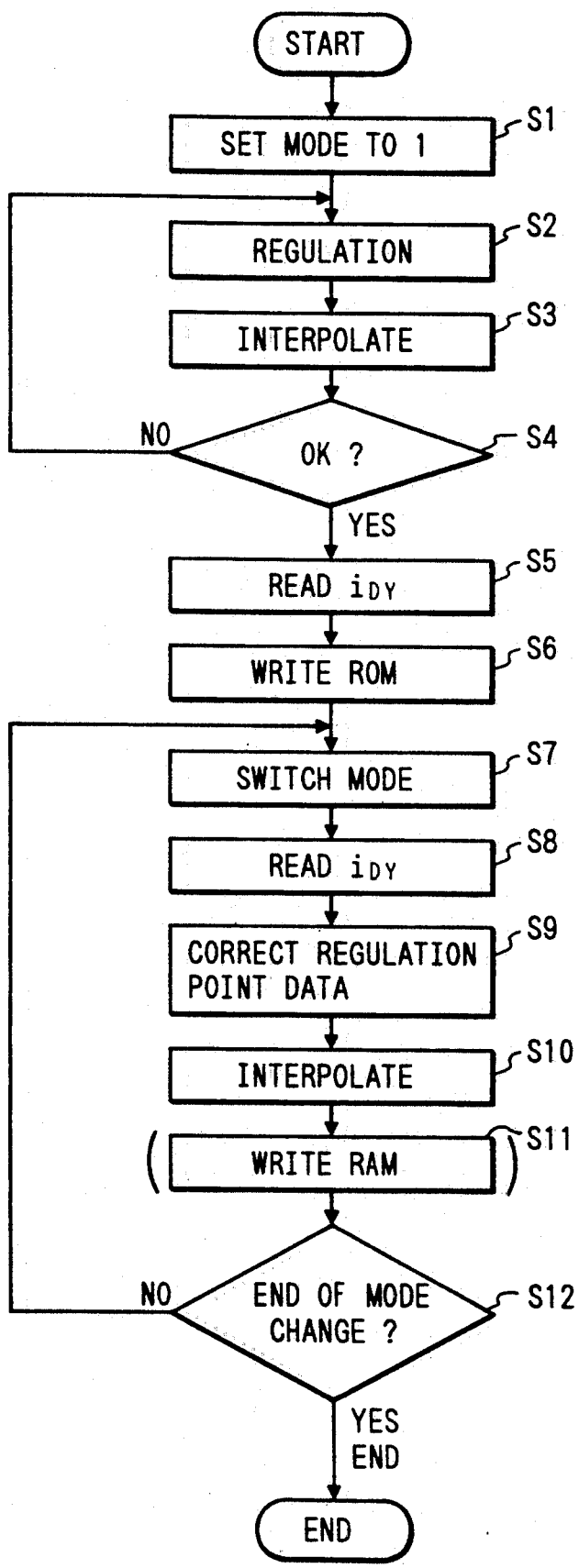
FIG. 4 is a flowchart of convergence regulation according to the first embodiment.

The above mentioned regulation method of convergence using the present system is summarised in a flowchart shown in FIG. 4. In a convergence correction system of a display device having a plurality of display modes different in raster size and signal specification from each other, Mode 1 is first selected as a reference mode (step S1) on which convergence regulation is performed to set convergence correction data of a regulation point (step S2), and then convergence correction data at respective correction points are obtained by time interpolation and written in the RAM 70 (step S3). In the step S4, regulation is repeated if the error of convergence is larger than an acceptable amount. Otherwise, the regulation is terminated, and deflection currents at respective regulation points are read (step S5) and written in the ROM 60 together with convergence correction data (step S6).

When a mode other than the reference mode is to be displayed, a mode switching is performed (step S7), and deflection currents at respective regulation points in that mode are read in (step S8) on which convergence correction data of the respective regulation points are obtained by interpolation utilizing the correlation between convergence correction data of the regulation points in Mode 1 and deflection currents in Mode 1 (step S9). On the basis of the thus obtained convergence correction data of the regulation points, convergence correction data of respective correction points are obtained by time interpolation in the same manner as in Mode 1 (step S10) and written in the RAM 70 (step S11). In this example, the above mentioned operations (steps S7 to S11) are performed every mode change (step S12).

Although this system requires a certain time for interpolation at every mode switching, the memory cost can be restricted. On the other hand, there is another method in which enough memory regions of the RAM 70 are kept for respective modes, and convergence correction data at respective correction points are preliminarily calculated and written in the memory regions, respectively. In such case, although memory size may be increased, it is possible to match convergence immediately at mode switching. In addition, if convergence correction data of regulation points for respective modes are stored in the ROM, it is possible to reduce time necessary for interpolation.

As mentioned, according to this embodiment, once convergence regulation for one mode as the reference is performed, it is possible to obtain convergence correction data suitable for that mode by interpolation based on the correlation between the convergence correction data of the reference mode and deflection currents by merely reading in deflection currents of respective regulation points in any other mode. Thus, a maximum correction accuracy can be obtained. Therefore, the procedure required for convergence regulation can be substantially reduced. This effect is advantageous when the number of display modes increases. Further, since this embodiment utilizes a combination of interpolation using deflection current as parameter and interpolation using time as parameter, both a high correction accuracy and a reduction of operation time are achieved simultaneously.

Figure 5:
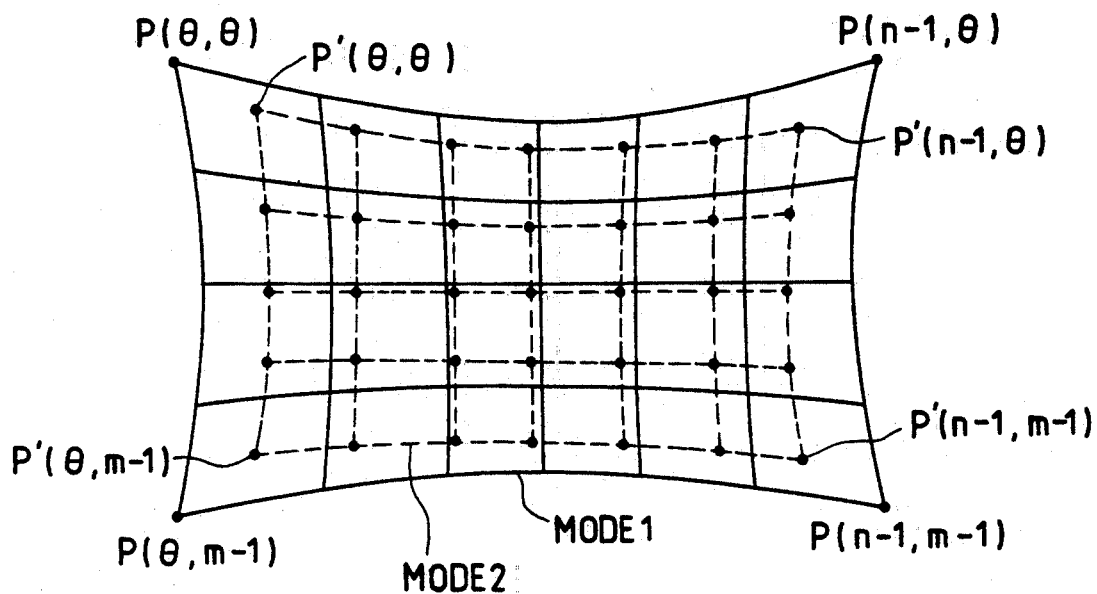
FIG. 5 shows a relation between regulation point and various modes.

Now, how to obtain convergence correction data of regulation points in other mode than the reference mode, that is, how to perform interpolation therefor, will be described in detail with reference to FIG. 5 which shows cross hatch images of two modes, Mode 1 and Mode 2, which are different in raster size. Regulation points in Mode 1, which is a reference mode, are represented by P, and those in mode 2 are depicted by P'. The number of regulation points is n(horizontal) $\times$ m(vertical), where n and m are positive integers. It is known that reliability of data obtained by extrapolation is generally lower than that of interpolation. Therefore, raster size of the reference Mode 1 should be enough to make interpolation possible.

There are two methods for obtaining correction data of a regulation point P'(k, 1) in Mode 2. In the first one of these methods, one of square-like areas of the cross hatch having lattice points as the regulation points P in Mode 1, including a regulation point P'(k,l), is determined, and then correction data of the point P'(k,l) is obtained by locally performing interpolation in and around that square-like area on the basis of the local correlation between convergence correction data of the regulation points which belong to the square-like area and deflection currents in Mode 1. In the second method, the correction data is calculated on the basis of the correlation between convergence correction data of all of the regulation points in Mode 1 and deflection currents in Mode 1.

In detail, in the first method, that square-like area of the cross hatch in Mode 1 which includes the regulation point P'(k,l) in Mode 2 is determined by sequentially comparing horizontal deflection current and vertical deflection current at the regulation point P'(k,l) with those at respective regulation points in Mode 1, and the convergence correction data of the regulation point P'(k,l) is obtained by performing interpolation in and around that square-like area on the basis of deflection currents. Since, in this method, such area is preliminarily determined, such local interpolation does not produce any problem.

Figure 6:
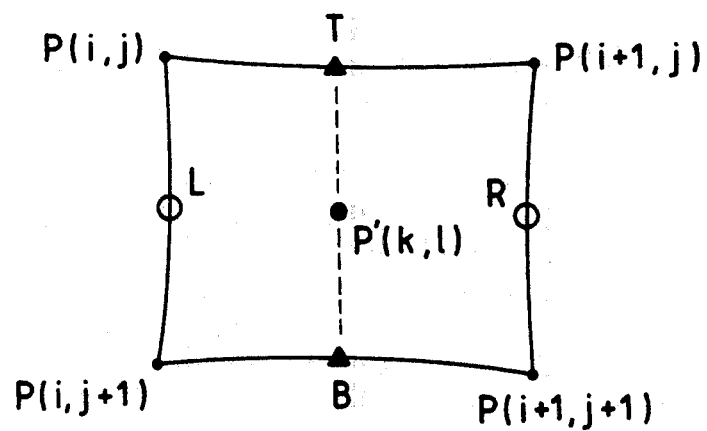
FIG. 6 illustrates a linear interpolation.

FIG. 6 illustrates an example of interpolation (linear interpolation) in that square-like area. Assuming that P'(k,l) in Mode 2 exists in an area having apices defined by regulation points P(i,j), P(i+1,j), P(i,j+1) and P(i+1,j+1) in Mode 1, a vertical deflection current $i_{VT}$ of a point T which has the same horizontal deflection current value as that of the point P'(k,l) and convergence correction data $CD_T$ are obtained by linear interpolation from the relations between vertical deflection currents $i_v(i,j)$ and $i_v(i+1,j)$, horizontal deflection currents $i_H(i,j)$ and $i_H(i+1,j)$ and convergence correction data $CD(i,j)$ and $CD(i+1,j)$ of points P(i,j) and P(i+1,j) according to the following equations:

$$i_{VT}=\{(i_H(i+1,j)i_H(k,l))i_V(i,j)+(i_H'(k,l)-i_H(i,j)) \\ i_V(i+1,j)\}/(i_H(i+1,j)-i_H(i,j)) \quad (1)$$

$$CD_T=\{(i_H(i+1,j)-H(k,l))CD(i,j)+(i_H(k,l) \\ -i_H(i,j))CD(i+1,j)\}/\{(i_H(i+1,j)-i_H(i,j)\} \quad (2)$$

Similarly, a vertical deflection current $i_{VB}$ of a point B, which has the same horizontal deflection current value as that of the point P'(k,l) and a convergence correction data $CD_B$ is obtained by linear interpolation from the relations between horizontal deflection currents $i_H$ (i,j+1) and $i_H$ (i+1, j+1), vertical deflection currents $i_V$ (i,j+1) and $I_V$ (i+1, j+1) and convergence correction data CD(i,j+1) and CD(i+1,j+1) of points P(i,j+1) and P(i+1, j+1) according to the following equations:

$$i_{VB}=\{(i_H(i+1,j+1)-i_H(k,l))i_V(i,j+1)+(i_H(k,l)-i_H(i,j+1))i_V(i+1,j+1)\}/\{(i_H(i+1,j+1)-i_H(i,j+1)\} \quad (3)$$

$$CD_B=\{(i_H(i+1,j+1)-i_H(k,l))CD(i,j+1)+(i_H(k,l)-i_H(i+j+1))CD(i+1,j+1)\}/\{i_H(i+1,j+1)-i_H(i,j+1)\} \quad (4)$$

Thereafter, convergence correction data CD'(k,l) for vertical deflection current value $i_V$, (k,l) of point P'(k,l) is obtained by linear interpolation from relations between convergence correction data $CD_T$ and $CD_B$ and respective vertical deflection currents $i_{VT}$ and $i_{VB}$ of the points T and B according to the following equation:

$$CD'(k,l)=\{(i_{VT}-i_V(k,l))CD_B+(i_V(k,l)-i_{VB})CD_T\}/\{i_{VT}-i_{VB}\} \quad (5)$$

According to this embodiment which utilizes both the deflection current comparison and linear interpolation, a high speed arithmetic operation is possible. However, in order to keep correction accuracy high, it is necessary to increase the number of regulation points to some extent. Alternatively, it is necessary to increase order of interpolation function by expanding the area to be interpolated and, after a square-like area is obtained, performing interpolation of the area including regulation points around the area.

Although, in the example shown in FIG. 6, the interpolation using horizontal deflection current is performed first to obtain data of the points T and B and then interpolation of vertical deflection current is performed, it is possible to perform interpolation of vertical deflection current first to obtain data of points L and R and then perform interpolation using horizontal deflection current.

Figure 7:
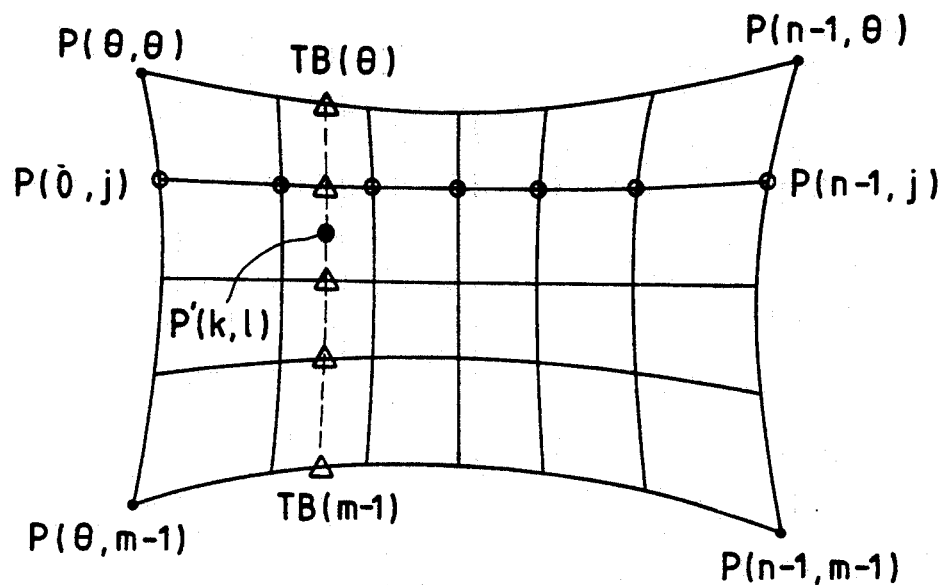
FIG. 7 illustrates high order interpolation.

The second method will be described with reference to FIG. 7 which illustrates a second example of interpolation of deflection current. Unlike the first method, the second method utilizes correlation between correction data and deflection currents of regulation points on a whole image plane to obtain convergence correction data of a new regulation point. The second method may be considered as one in which a square-like area in the first method is expanded up to the whole image plane to increase the order of interpolation. Since the square-like area is the whole image plane, there is no need for area selection, and it is enough to perform interpolation. First, convergence correction data $D_V(j)$ and vertical deflection current $i_V(j)$ of a point TB(j) having the same horizontal deflection current $i_H(k,l)$ as that of regulation point P'(k,l) in a currently employed mode are obtained from correlation between horizontal deflection currents $i_H$ (0,j)–$i_H$(n−1,j) and convergence correction data CD(0,j)–CD(n−1,j) of regulation points P(0,i)–P(n−1,j) in line j in the reference mode. This is performed for every regulation point in the reference mode, and convergence correction data $D_V(0)-D_V(m-1)$ and vertical deflection currents $i_V(0)-i_V(m-1)$ of points TB(0)–TB(m−1) having the same horizontal deflection current as $i_H(k,l)$ of a certain regulation point P'(k,l) in the current mode are obtained by interpolation. Then, convergence correction data CD'(k,l) for the same vertical deflection current $i_V(k,l)$ as that of the certain regulation point P'(k,l) is obtained by interpolation from correlation between convergence correction data $D_V(0)-D_V(m-1)$ and vertical deflection currents $i_V(0)-i_V(m-1)$ thus obtained for one line. Since this utilizes a high order interpolation on the basis of information of the whole image plane, it is possible to interpolate smoothly even if the number of regulation points is relatively small. In this case, interpolations using vertical deflection current first and then horizontal deflection current as parameters can be performed in that order. Further, in both the first and second methods, when the variation of vertical deflection current within one scan line is small, vertical deflection currents of regulation points in each line can be represented by a vertical deflection current at any one point in the line, so that it is possible to reduce read-in time of deflection current, operation time, and, ROM capacity, etc.

Although the regulation point has been described as the same as deflection current read-in point, it is not always necessary to set them at the same point. It is possible to select any suitable point among correction points, read deflection data thereinto and perform interpolation using correlation between the deflection current read-in and convergence correction data at that point.

In general, when the number of regulation points is n, the order of interpolation function becomes n−1. A correlation equation between deflection current and convergence correction data can be obtained by inserting deflection currents i and convergence correction data CD of respective regulation points into (n-1)th order function such as shown by the following equation (6), sequentially, and by obtaining a coefficient a(j) by solving simultaneous equations thus obtained.

$$CD = \sum_{j=0}^{n-1} a(j) \, i^j \quad (6)$$

Instead of solving such simultaneous equations, convergence correction data can be obtained directly by using Lagrange's interpolation formula, with the same effect.

Figure 8:
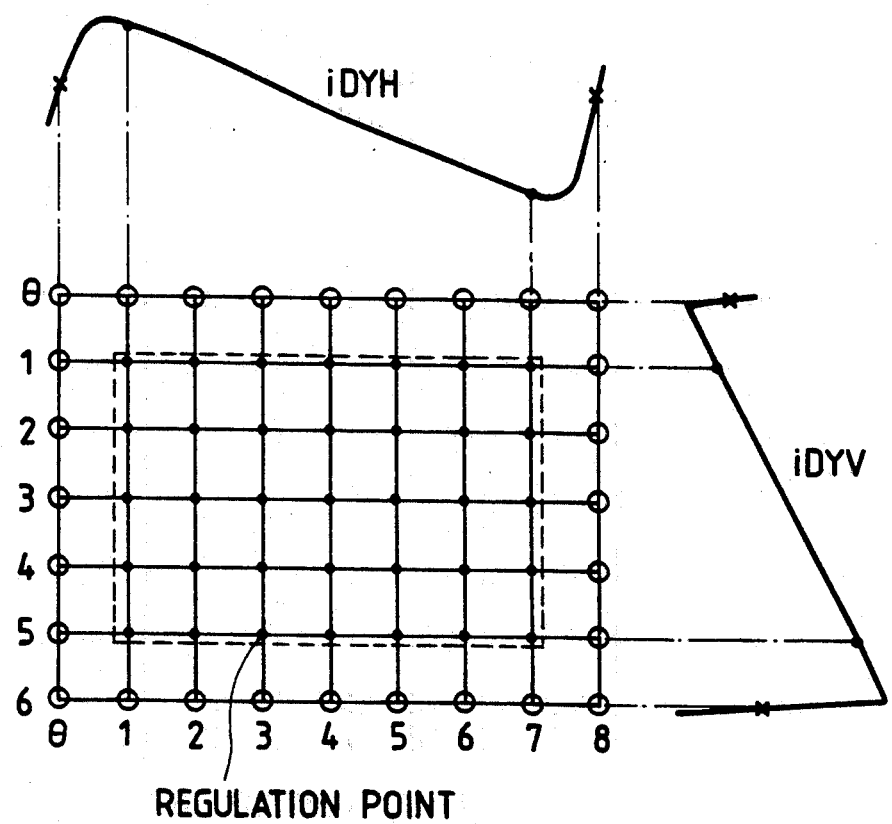
FIG. 8 shows a relation between deflection current and regulation point.

Now, deflection current to be stored in the ROM 60 and used as a basis of the interpolation will be described with reference to FIG. 8 which shows a relation between deflection current and regulation points. This figure includes blanking periods, and the area surrounded by the dotted line is a portion actually displayed on an image plane. Regulation points outside the dotted line are not regulated actually, and convergence correction data thereof have to be produced by extrapolation. On the other hand, deflection currents exhibit monotonous variations within a display period. However, their variations in blanking periods are drastic. Therefore, it is impossible to obtain a correlation between convergence correction data and deflection currents in such drastically changing areas. In order to solve this problem, system is provided, according to the present invention, in which data for deflection currents in the blanking period is produced by extrapolation and stored in the ROM 60. It is, of course, possible to store convergence correction data and deflection current for only regulation points within a display period in the ROM 60, obtain convergence correction data for the regulation points within the display period in another mode than the reference mode by using the correlation therebetween, and finally obtain convergence correction data for regulation points outside the image plane by extrapolation.

Figure 9:
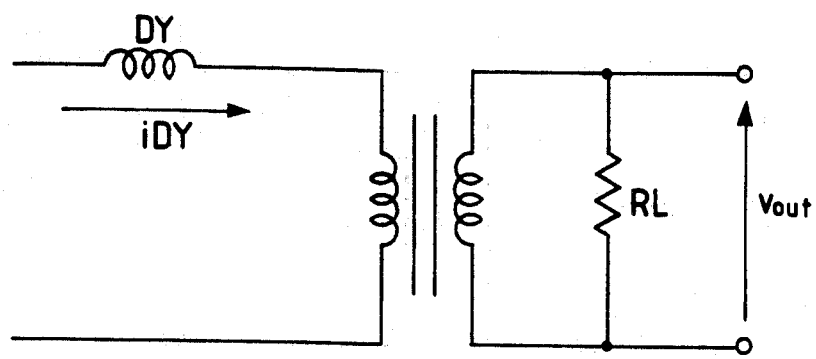
FIG. 9 is a first example of a deflection current detection circuit.
Figure 10:
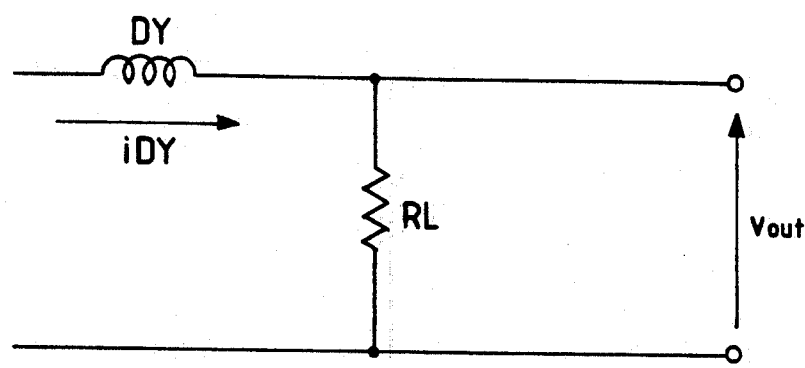
FIG. 10 is a second example of a deflection current detection circuit.

The deflection current detection circuits 10 and 11 (FIG. 1) function to convert deflection currents into voltages, and it is desired that they do not affect the deflection circuits substantially. FIG. 9 shows an example of construction of either deflection current detection circuit. The deflection current detection circuit comprises a current transformer whose primary winding is connected in series with the DY coil and secondary winding is connected in parallel to a resistor for conversion into voltage. FIG. 10 is another example of a deflection current detection circuit in which a resistor is connected in series with the DY coil to directly convert current into voltage. Although either of the deflection current detection circuits shown in FIGS. 9 and 10 is preferable, deflection current may be detected by using a current probe utilizing a Hall element, etc. Since such current probe is usually detachable, it is possible to attach it to the device for only convergence regulation of a multi-mode display device. Such probe is not always necessary to be assembled in the device so long as convergence correction data for respective modes is preliminarily obtained by performing interpolation using deflection currents and stored in the memory. Thus, it is possible to reduce the size of the deflection current detection circuitry. In this case, it should be noted that the data can not be used when the operation mode stored after regulation is switched to a different mode.

The parameter which requires correction data which has a dependency on image screen position is not limited to convergence. By dynamically correcting variation of luminance, white balance and focus according to locations on the image plane, remarkable improvements on these parameters are possible.

Figure 11:
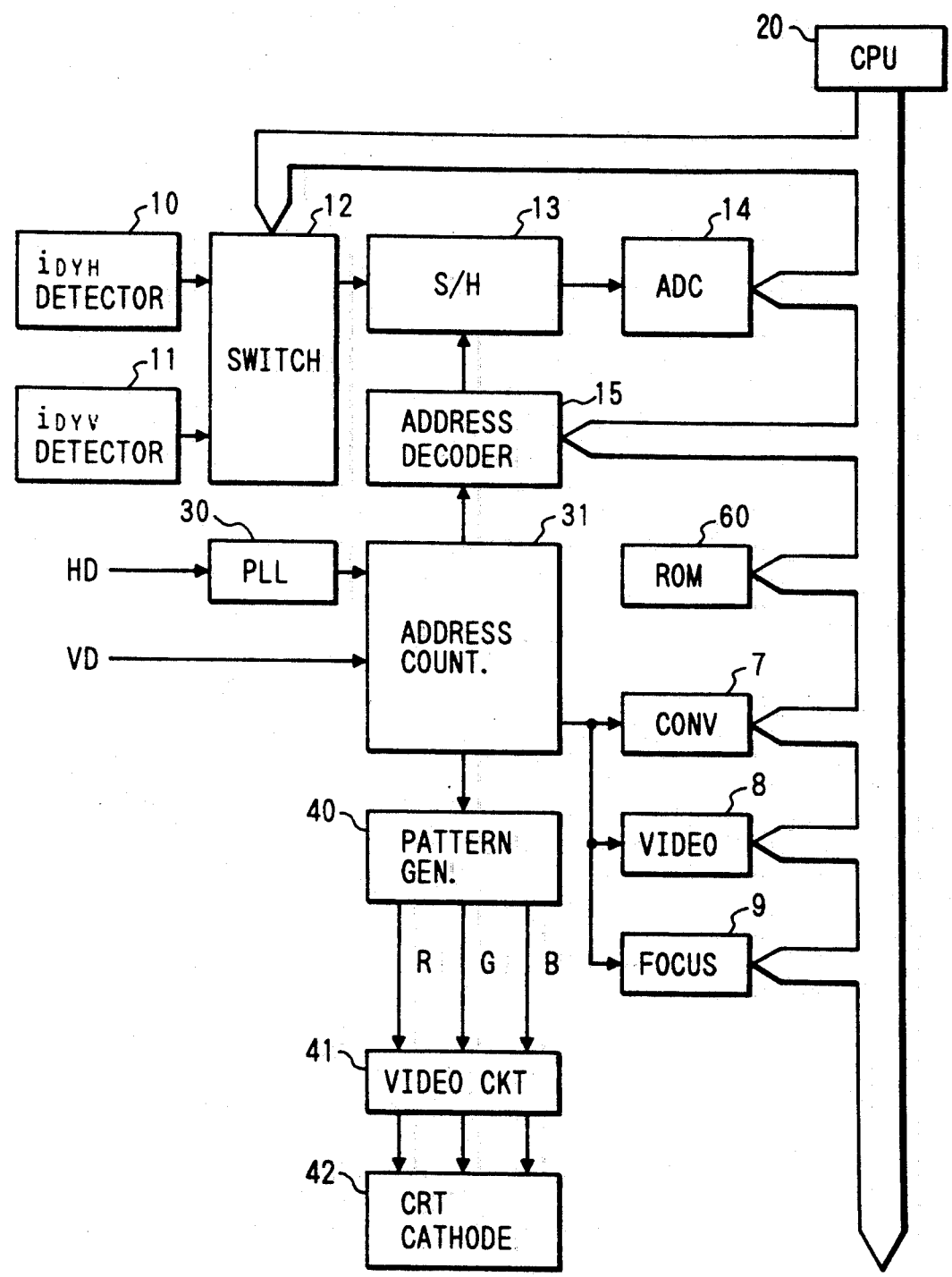
FIG. 11 shows a construction of a second embodiment of the present invention.

FIG. 11 shows a construction of a second embodiment of the present invention. This embodiment is basically similar in structure to that shown in FIG. 1, and the same reference numerals in FIG. 11 depict the same constitutional components as those shown in FIG. 1, respectively. This embodiment differs from the embodiment in FIG. 1 in that it includes, in addition to a convergence correction unit 7, a video correction unit 8 and a focus correction unit 9. Therefore, only those units 8 and 9 will be described.

The focus correction unit 9 has a similar construction to the convergence correction unit 7 except that a focus coil and a focus coil drive amplifier are used instead of the CY coil 74 and the CY amplifier 73 of the convergence correction unit 7, respectively.

The video correction unit 8 has also a similar construction to that of the convergence correction unit 7 except that the CY amplifier 73 and the CY coil 74 of the unit 7 are removed so that an output of the LPF 72 is directly supplied to an input of a control terminal of the video circuit 41.

The regulation method and operation of the digital circuit portion of each of the video correction unit 8 and the focus correction unit 9 are similar to those for the convergence correction unit 7 and only differ from the unit 7 in the object to be corrected and circuit constructions next to analog conversion.

The correction object of the video correction unit 8 is luminance of respective red, green and blue colors and contrast, and the correction object of the focus correction unit 9 is focus, that is, current flowing through a focus coil. According to this embodiment, in addition to the convergence correction, luminance variation, white balance variation and focus variation can be regulated favorably regardless of signal specification and raster size, and it is enough to perform a regulation for only one mode.

As shown in FIG. 2, the raster shape is subjected to a pin type distortion under no correction, the larger the distortion resulting in the larger amount of convergence correction and hence the larger power consumption. Therefore, it is conventional to reduce pin type distortion by amplitude-modulation of deflection currents.

Figure 13:
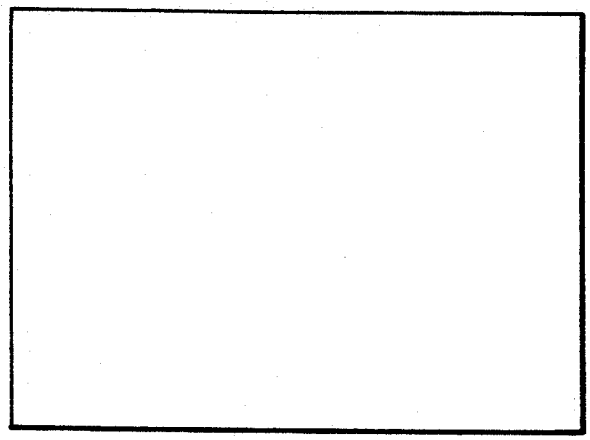
FIG. 13 illustrates an image distortion at a time when raster size is changed.
Figure 13:
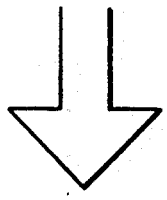
Figure 13:
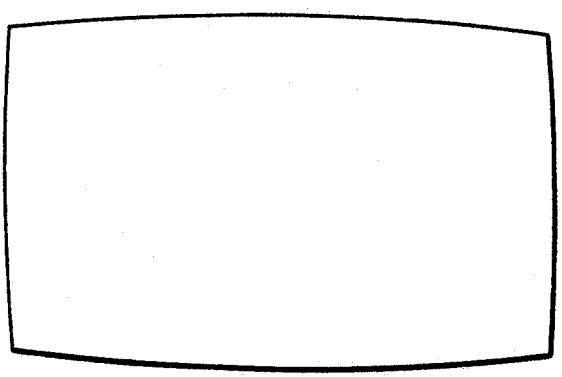

In such case where pin type distortion is reduced by amplitude-modulating, for example, horizontal deflection current, if only vertical deflection size is varied, a barrel type distortion is produced as shown in FIG. 13. That is, the barrel type distortion is due to the fact that the amount of modulation before vertical deflection size is varied is kept as it is even after the variation.

In a usual interpolation utilizing correlation between convergence correction data and deflection current, this distortion of image can not be corrected although convergence can be corrected.

Figure 12:
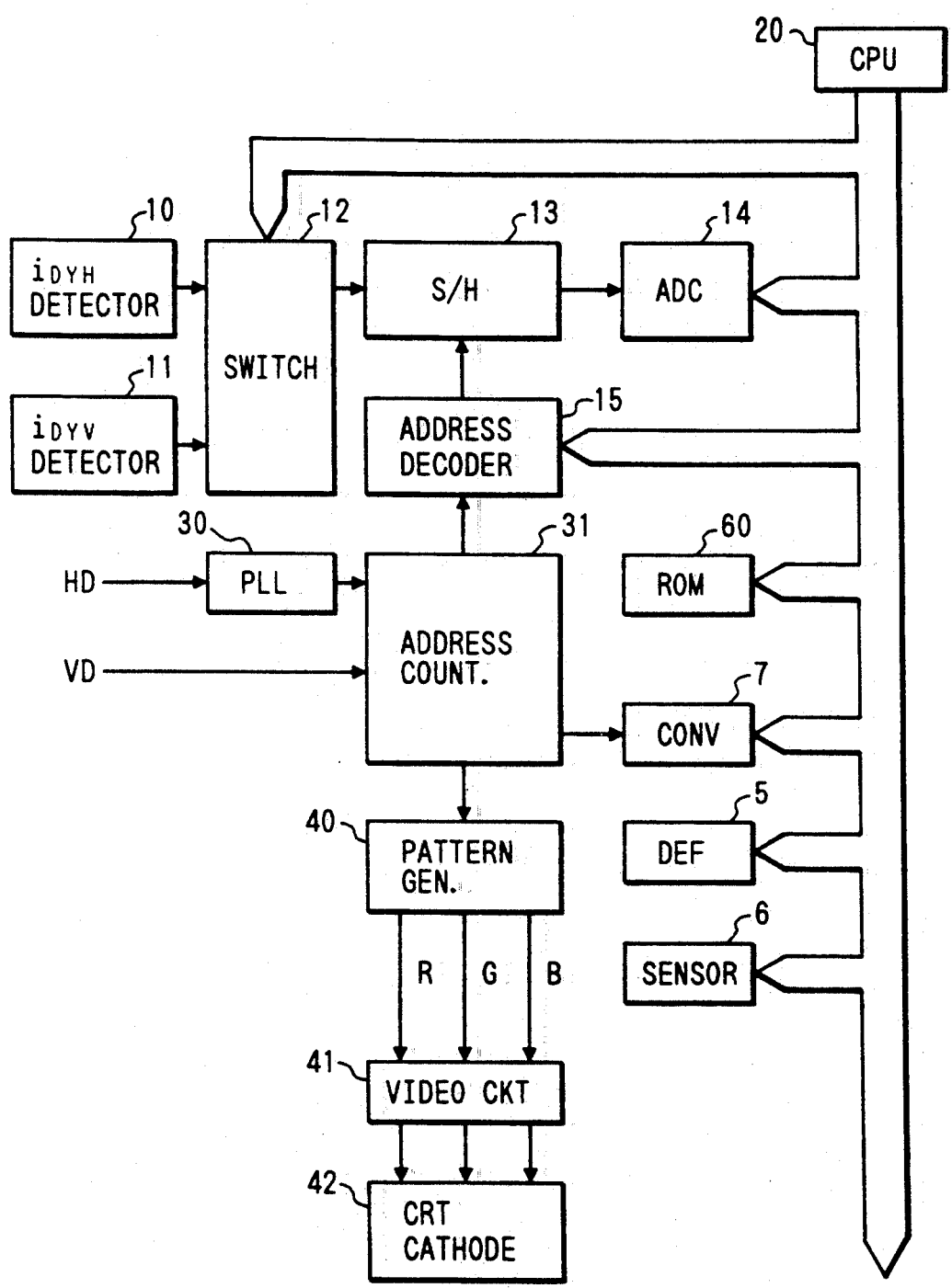
FIG. 12 shows a construction of a third embodiment of the present invention.

FIG. 12 shows a construction of a third embodiment of the present invention which is suitable to solve this problem. In this embodiment, in addition to a convergence correction unit 7, a deflection circuit 5 and a power sensor 6 are connected to CPU 70.

In the embodiment shown in FIG. 12, the deflection circuit 5 is controlled according to deflection size. Since deflection current can be read in a memory according to this system, the amount of modulation of the deflection circuit is controlled according to the deflection size read out from the memory. Further, since deflection size as well as position of deflection center is also closely related to convergence correction amount, they should be optimized according to a display condition. To this end, the power sensor 6 is provided to control deflection amplitude and center position of deflection such that power consumption becomes minimum.

According to this embodiment, correction of image distortion and reduction of power consumption are possible, in addition to the convergence correction similar to that obtainable in the embodiment shown in FIG. 1.

Figure 14:
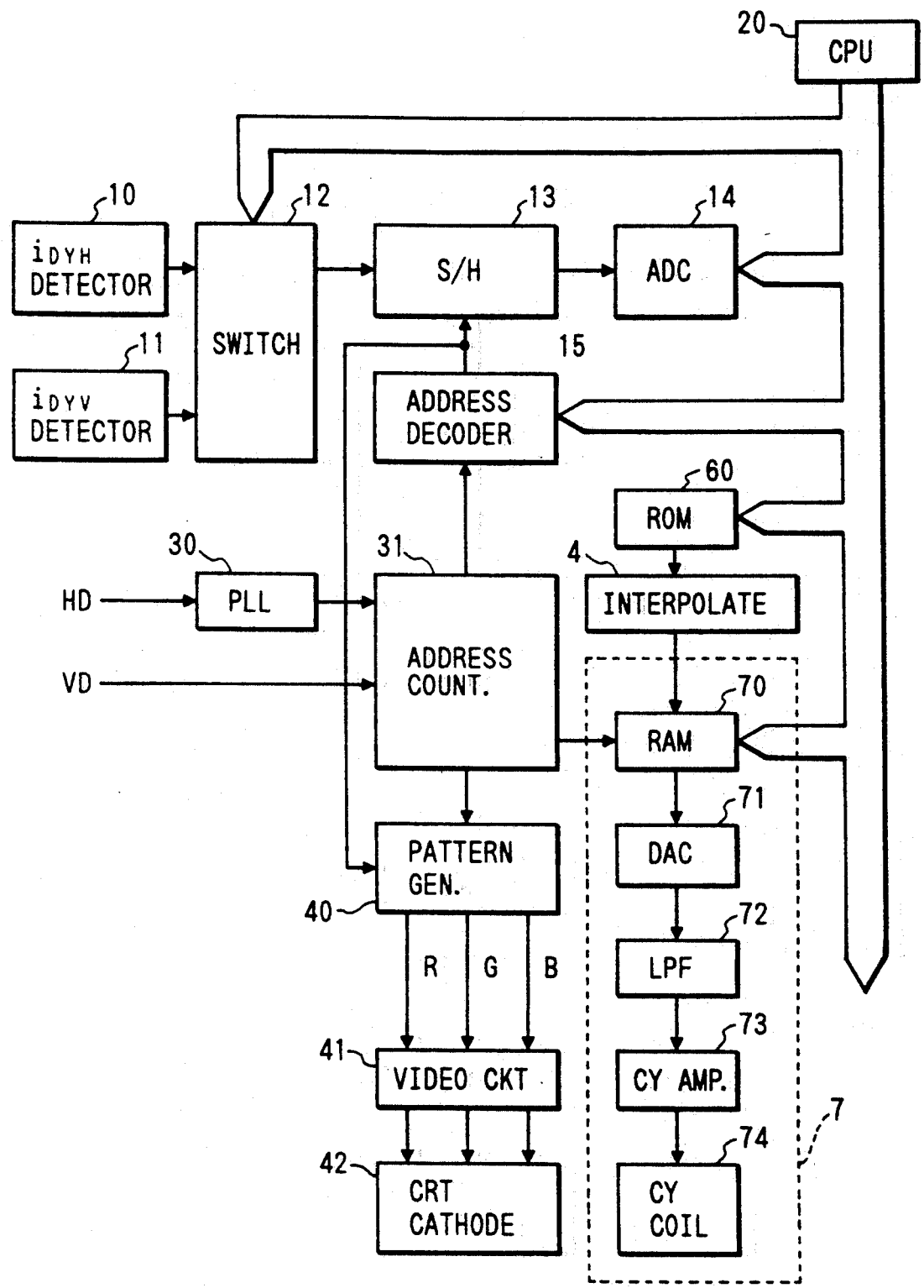
FIG. 14 shows a construction of a fourth embodiment of the present invention.

FIG. 14 shows a fourth embodiment of the present invention. This embodiment differs from the first embodiment shown in FIG. 1 in two points, these points will be described below:

(1) An interpolation circuit 4 is provided separately from the CPU which is dedicated to interpolation for obtaining regulation point data in another mode than the reference mode by utilizing correlation between deflection current and convergence correction data and interpolation for obtaining convergence correction data of respective correction points from convergence correction data of regulation points. Generally, the higher the accuracy of interpolation, the longer the time required. This interpolation circuit 4 is effective in reducing operation time while keeping the accuracy.

(2) Sampling pulses from address decoder 15 for sampling deflection current are input to a pattern generator circuit 40 to mix them to a display pattern signal so that they can be displayed on the same image screen.

In order to maintain correction accuracy, matching of sampling timing of deflection current with timing for controlling timing of raster correction with convergence correction data is very important in this system. Particularly, since deflection current may have drastically changed in blanking periods, mismatching between these timing may cause correlation between deflection current and convergence correction data to be broken. By allowing the sampling pulses to be confirmed on the image screen, correlation between deflection current and convergence correction data can be maintained, making highly accurate correction possible.

Figure 15:
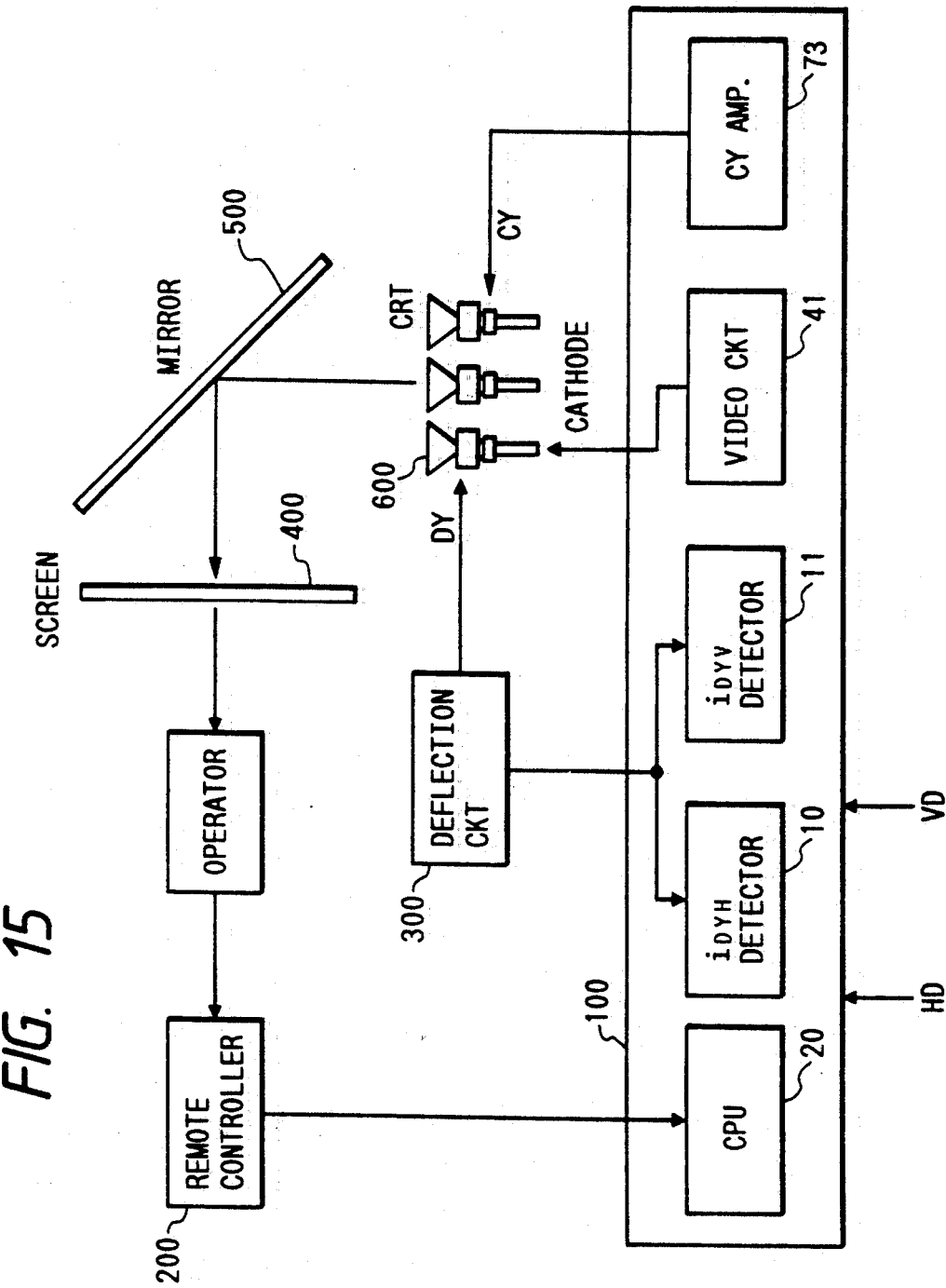
FIG. 15 is a schematic block diagram of a projection type display device having a digital convergence correction device according to the present invention.

FIG. 15 shows an example of a display device which is of a projection type which includes the digital convergence correction device according to the present invention. In FIG. 15, the display device comprises a convergence correction device 100 which may be constructed according to the first embodiment shown in FIG. 1, a remote controller 200 for convergence regulation, a horizontal and vertical deflection circuit 300, three CRTs 600 for producing basic three colors, red, green and blue, respectively, a mirror 500 and a screen 400 for projecting an image. Three color images from the CRTs 600 are projected through the mirror 500 onto the image screen 400 while enabling correction of image distortion by means of a convergence yoke (CY) provided for each CRT. Therefore, a total of 6 convergence correction units, each such as shown by the dotted line in FIG. 1, are required to perform corrections in horizontal and vertical directions for the CRT's.

Convergence regulation is performed by the remote controller 200 operated by an operator while looking at the image screen.

As described hereinbefore, according to the present invention in which convergence correction data (image correction data) of regulation point is obtained by interpolation on the basis of deflection currents having a 1:1 correspondence to an image screen position, it is possible to correct convergence sufficiently even for different display modes in which raster size and/or signal specification is different. Further, since it is enough to regulate image correction for only one display mode which is reference, regulation itself can be simplified.

Although the present invention has been described with reference to the specific embodiments, this description is not meant to be construed in a limiting sense. Various modifications of the described embodiments, as well as other embodiments of the present invention, will become apparent to persons skilled in the art upon reference to the description of the present invention. It is, therefore, contemplated that the appended claims will cover any modifications or embodiments as fall within the true scope of the present invention.

What is claimed is:

1. An image correction system for use in an image display device including a display mode selector for selecting one of a plurality of different display modes and a display tube having an image screen, deflection coils, and means for receiving an input video signal, the image display device being operable in any of the different display modes, said image correction system comprising:

address generating means for generating addresses corresponding to positions on the image screen of the image display device in synchronism with an input video signal;

pattern generating means for generating, in synchronism with the input video signal, a display pattern for regulating positions of regulation points selected from correction points on the image screen;

first storing means for storing correction data of the correction points at addresses generated by said address generating means;

digital to analog converter means for converting a digital signal read out from said first storing means into an analog signal;

regulating means responsive to the analog signal for regulating parameters of the display tube of the image display device;

deflection current detecting means for detecting deflection current flowing through the deflection coils of the image display device;

second storing means for storing correction data and the deflection currents detected by said deflection current detecting means during a reference display mode;

correction data generating means for generating correction data for the correction points in a display mode other than the reference display mode by interpolation based on the content of said second storing means and deflection currents detected during the other display mode by said deflection current detecting means, and for supplying the generated correction data to said first storing means; and central processing means for controlling operation of said image correction system.

2. The image correction system claimed in claim 1, wherein said regulating means comprises a convergence yoke driver and a convergence yoke coil for regulating convergence and distortion of image.

3. The image correction system claimed in claim 1, wherein said regulating means comprises means for supplying the analog signal from said digital to analog converter means to a control terminal of the image display device to regulate white balance and luminance.

4. The image correction system claimed in claim 1, wherein said regulating means comprises a focus coil driver and a focus coil for correcting focus.

5. The image correction system claimed in claim 1, further comprising means for detecting power dissipation of the image display device, means for controlling deflection size and deflection position of the image display device such that the power dissipation becomes minimum.

6. The image correction system claimed in claim 1, wherein the image display device further has image distortion correcting means, said image correction system further comprising means for controlling the image distortion correcting means of the image display device in accordance with the deflection current detected by said deflection current detecting means.

7. An image correction system for use in an image display device including a display mode selector and a display tube having an image screen, deflection coils, and means for receiving an input video signal, said image correction system comprising:

address generating means for generating addresses corresponding to positions on the image screen of the image display device in synchronism with an input video signal;

pattern generating means for generating, in synchronism with the input video signal, a display pattern for regulating positions of regulation points selected from correction points on the image screen;

first storing means for storing correction data of the correction points at addresses generated by said address generating means;

digital to analog converter means for converting a digital signal read out from said first storing means into an analog signal;

regulating means responsive to the analog signal for regulating parameters of the display tube of the image display device;

deflection current detecting means for detecting deflection current flowing through the deflection coils of the display device;

second storing means for storing correction data and the deflection currents detected by said deflection current detecting means during a reference display mode;

correction data generating means for generating correction data for the correction points by interpolation utilizing correlation between the deflection currents and convergence correction data corresponding to the deflection currents when deflection currents of correction points are changed due to change of a scan condition of the display device, and for supplying the generated correction data to said first storing means; and central processing means for controlling operation of said image correction system.

8. The image correction system claimed in claim 1, wherein said first storing means stores image correction data and deflection currents for a plurality of points on the image screen in a display mode providing a large raster size.

9. The image correction system claimed in claim 7, further comprising means for obtaining image correction data for a portion of respective correction points by interpolation utilizing the deflection currents as a variable and utilizing correlation between the deflection currents and image correction data corresponding to the deflection currents, and for obtaining image correction data for other correction points by interpolation utilizing time as a variable from the correction points of said portion of the correction points when deflection currents of correction points are changed due to change of a scan condition of the display device.

10. The image correction system claimed in claim 1, further comprising means for detecting deflection currents in only a display period and for obtaining deflection current in blanking periods by extrapolation.

11. The image correction system claimed in claim 1, wherein said correction data generating means utilizes a linear function as an interpolation function.

12. The image correction system claimed in claim 1, wherein said correction data generating means utilizes Lagrange's function as an interpolation function.

13. The image correction system claimed in claim 1, further comprising means for applying detection time of the deflection current to the image screen for displaying thereon.

14. The image correction system claimed in claim 1, wherein said deflection current detecting means includes a current transformer.

15. The image correction system claimed in claim 1, wherein said deflection current detecting means includes a resistor in series with the deflection coil in the image display device, and means for detecting voltage drop across said resistor.

16. The image correction system claimed in claim 1, wherein said deflection current detecting means includes a current probe.

17. A method of correcting convergence of a display device having a plurality of display modes different in raster size and signal specification from each other, said method comprising the steps of:

a) selecting a reference display mode;

b) regulating convergence in the reference display mode to obtain convergence correction data for each of a plurality of regulation points selected from a plurality of correction points on an image screen of the display device;

c) obtaining convergence correction data for each of the correction points by time interpolation utilizing convergence correction data of the regulation points;

d) detecting deflection currents corresponding to the regulation points;

e) storing the convergence correction data for the correction points in first storing means;

f) storing deflection currents at respective regulation points in said first storing means;

g) switching the corrected display mode from the reference display mode to a second display mode;

h) detecting deflection currents at respective regulation points in the second display mode;

i) obtaining convergence correction data for the respective regulation points by interpolation utilizing the correction between convergence correction data of the regulation points and deflection currents in the reference mode;

j) on the basis of the thus obtained convergence correction data for the regulation points, obtaining convergence correction data for respective correction points by time interpolation in the same manner as in the reference mode;

k) storing the convergence correction data in second storing means; and l) correcting an image on the image screen on the basis of the content of the second storing means.

18. The method claimed in claim 17, further comprising, between the steps c) and d), the step of:

m) checking whether the convergence correction data obtained in the step c) is satisfactory, and if not repeating steps b) and c).

19. The method claimed in claim 18, further comprising step of:

n) checking whether there is a further display mode to be switched, and if so repeating steps b) to l).

20. An image correction system for use in an image display device including a display mode selector for selecting one of a plurality of different display modes, a display screen, convergence yoke coils, and vertical and horizontal deflection coils and operable in any of the different display mode, said image correction system comprising:

an address generator for generating addresses of correction points corresponding to display positions on the display screen on the basis of a basic clock signal obtained from a horizontal synchronizing signal and a vertical synchronizing signal;

a pattern generator for generating a pattern of regulation points selected from the correction points on the display screen;

a convergence regulator for regulating positions of regulation points on the display screen by regulating convergence currents flowing through the convergence yoke coils of the display device so that the positions of the regulation points become regular;

a first memory for storing correction data obtained by the regulation of the convergence currents, together with the addresses of the regulation points;

interpolation means for obtaining convergence regulation data for correction points existing between adjacent ones of the regulation points by interpolation, using the convergence correction data of the regulation points;

detecting means for detecting deflection currents flowing through the vertical and horizontal deflection coils of the display device when the regulation points are regulated by said convergence regulator;

a second memory for storing convergency regulation data of the regulation points obtained by said convergence regulator, the correction points obtained by said interpolation means, and the deflection currents detected by said detecting means; and parameter regulation means for regulating parameters of the display device on the basis of the convergence regulation data and the deflection currents stored in said second memory when the display mode is switched to another display mode.

21. The image correction system claimed in claim 20, wherein said parameter regulation means includes means for regulating convergence and image distortion.

22. The image correction system claimed in claim 20, wherein said parameter regulation means includes means for regulating white balance and luminance.

23. The image correction system claimed in claim 20, wherein said parameter regulation means includes means for regulating focus.

24. The image correction system claimed in claim 20, further comprising means for detecting power dissipation of the image display device, means for controlling deflection size and deflection position of the image display device, and means for controlling the deflection size and deflection position such that the power dissipation becomes minimum.

25. The image correction system claimed in claim 20, further comprising means responsive to the deflection size of the deflection currents stored in said second memory for controlling correction of image distortion with the deflection coils of the display device.

26. The image correction system claimed in claim 20, wherein said second memory stores image correction data and defection currents for a plurality of points on the image screen in a display mode providing a large raster size.

27. The image correction system claimed in claim 20, further comprising means for detecting deflection currents in only a display period and for obtaining deflection currents in a blanking period by extrapolation of the deflection current in the display period.

28. The image correction system claimed in claim 20, further comprising second detecting means for detecting defection currents flowing through the vertical and horizontal deflection coils of the image display device when the deflection currents of the correction points are changed due to change of scanning condition of the image display device; and second interpolation means for obtaining image correction data for the respective correction points by interpolation based on a correlation between the deflection currents and the image correction data for the respective correction points.

29. The image correction system claimed in claim 28, further comprising means for obtaining image correction data for a portion of respective correction points by interpolation of deflection currents based on a correlation between the deflection currents and convergence correction data corresponding to the deflection currents, and for obtaining image correction data for other correction points by time interpolation using the image correction data of the portion of the correction points.

30. The image correction system claimed in claim 28, wherein said second interpolation means performs interpolation by using a linear function.

31. The image correction system claimed in claim 28, wherein said second interpolation means performs interpolation by using a Lagrange's function.

32. The image correction system claimed in claim 26, further comprising means for applying detection timing of deflection currents to the display screen of the image display device for display thereon.

33. The image correction system claimed in claim 20, wherein said deflection current detecting means includes a current transformer.

34. The image correction system claimed in claim 20, wherein said deflection current detecting means includes a resistor in series with one of the deflection coils of the display device, and means for detecting voltage drop across said resistor.

35. The image correction system claimed in claim 20, wherein said deflection current detecting means includes a current probe.

* * * * *